United States Patent
Han et al.

(10) Patent No.: US 10,820,295 B2
(45) Date of Patent: Oct. 27, 2020

(54) METHOD, TERMINAL DEVICE AND COMPUTER-READABLE STORAGE MEDIUM FOR WIRELESS CONNECTION

(71) Applicant: GUANGDONG OPPO MOBILE TELECOMMUNICATIONS CORP., LTD., Dongguan, Guangdong (CN)

(72) Inventors: Tong Han, Guangdong (CN); Mingqiang Guo, Guangdong (CN); Qiang Zhang, Guangdong (CN); Hao Wang, Guangdong (CN); Rendong Shi, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 133 days.

(21) Appl. No.: 16/032,818

(22) Filed: Jul. 11, 2018

(65) Prior Publication Data

US 2019/0037526 A1 Jan. 31, 2019

(30) Foreign Application Priority Data

Jul. 28, 2017 (CN) .......................... 2017 1 0633591

(51) Int. Cl.
*H04W 64/00* (2009.01)
*H04W 76/11* (2018.01)
(Continued)

(52) U.S. Cl.
CPC ........ *H04W 64/003* (2013.01); *G06F 1/1698* (2013.01); *G06F 3/017* (2013.01);
(Continued)

(58) Field of Classification Search
CPC .... G06F 3/017; G06F 3/0488; G06F 3/04883; G06F 1/1698; H04W 8/005; H04W 76/10; H04W 76/11
(Continued)

(56) References Cited

U.S. PATENT DOCUMENTS

| 2010/0167646 A1* | 7/2010 | Alameh | ................ | G06F 3/017 455/41.2 |
| 2012/0324559 A1 | 11/2012 | Ran | | |

(Continued)

FOREIGN PATENT DOCUMENTS

| CN | 104284331 A | 1/2015 |
| CN | 105072253 A | 11/2015 |

(Continued)

OTHER PUBLICATIONS

International Search Report for PCT application No. PCT/CN2018/094904 filed on Jul. 6, 2018; dated Oct. 10, 2018.
(Continued)

*Primary Examiner* — Lee Nguyen
(74) *Attorney, Agent, or Firm* — Ladas & Parry LLP

(57) ABSTRACT

Provided are a wireless connection method and device, a terminal and a computer-readable storage medium. The method includes that: when the first mobile terminal is in a screen-off state, a first trajectory input by a user is received. When a second trajectory for a second mobile terminal is matched with the first trajectory, a wireless connection is established between the first mobile terminal and the target mobile terminal.

15 Claims, 7 Drawing Sheets

(51) Int. Cl.
*H04W 4/80* (2018.01)
*H04L 29/06* (2006.01)
*G06F 1/16* (2006.01)
*G06F 3/0488* (2013.01)
*H04W 8/00* (2009.01)
*H04M 1/725* (2006.01)
*G06F 3/01* (2006.01)
*H04W 76/10* (2018.01)
*G06F 3/0346* (2013.01)
*H04W 12/08* (2009.01)
*H04W 12/00* (2009.01)
*H04W 4/02* (2018.01)
*H04W 84/12* (2009.01)

(52) U.S. Cl.
CPC .......... *G06F 3/0346* (2013.01); *G06F 3/0488* (2013.01); *G06F 3/04883* (2013.01); *H04L 63/18* (2013.01); *H04M 1/7253* (2013.01); *H04W 4/80* (2018.02); *H04W 8/005* (2013.01); *H04W 12/003* (2019.01); *H04W 12/08* (2013.01); *H04W 64/006* (2013.01); *H04W 76/10* (2018.02); *H04W 76/11* (2018.02); *H04W 4/026* (2013.01); *H04W 84/12* (2013.01)

(58) Field of Classification Search
USPC ........................................................ 455/41.2
See application file for complete search history.

(56) References Cited

U.S. PATENT DOCUMENTS

2014/0006954 A1  1/2014  Raffa
2014/0206287 A1  7/2014  Chang et al.
2015/0378501 A1  12/2015 Chen et al.
2016/0065301 A1  3/2016  Kukulski et al.

FOREIGN PATENT DOCUMENTS

CN   105246024 A   1/2016
CN   105703807 A   6/2016
CN   107465997 A   12/2017

OTHER PUBLICATIONS

Extended European Search Report for EP application No. 18182909.4, dated Dec. 6, 2018.

Communication pursuant to Article 94(3) EPC for EP application No. 18182909.4, dated May 18, 2020.

Anonymous: "Shake a Secure Bluetooth Connection-Slashdot", Nov. 17, 2007 (Nov. 17, 2007), XP055694864, Retrieved from the Internet: URL:https://mobile.slashdot.org/story/07/11/17/1231254/shake-a-secure-bluetooth-connection [retrieved on May 13, 2020], pp. 1-21.

* cited by examiner

METHOD, TERMINAL DEVICE AND COMPUTER-READABLE STORAGE
MEDIUM FOR WIRELESS CONNECTION

CROSS-REFERENCE TO RELATED
APPLICATIONS

This application claims priority to Chinese Patent Application No. 201710633591.X, filed Jul. 28, 2017, entitled "Bluetooth Connection Method and Device, Terminal and Computer-readable Storage Medium". The above identified application is hereby incorporated herein by reference in its entirety.

TECHNICAL FIELD

Embodiments of the disclosure relate to a wireless communication technology, and particularly to a wireless connection method and device, a terminal and a computer-readable storage medium.

BACKGROUND

Along with the development of smart phones, Bluetooth communication becomes a common data transmission manner. Two terminals may perform data interaction after establishing a Bluetooth connection.

At present, a Bluetooth connection manner is that: a user executes a Bluetooth pairing operation on a Bluetooth connection interface after unlocking a terminal, and two pieces of Bluetooth equipment which are successfully paired establish a Bluetooth connection. However, a present Bluetooth connection operation is more cumbersome and the Bluetooth connection efficiency is low.

SUMMARY

The disclosure provides a method, terminal device and computer-readable storage medium for wireless connection.

In at least one alternative embodiment, a method of wireless connection is provided, including: obtaining a first trajectory for a first terminal device, the first terminal device being in a screen-off state, the first trajectory indicating a trajectory of a first gesture; determining whether a second trajectory for a second terminal device is matched with the first trajectory, the second trajectory indicating a trajectory of a second gesture; and establishing a wireless connection between the first terminal device and the second terminal device, in response to the determination that the second trajectory is matched with the first trajectory.

In at least one alternative embodiment, a first terminal device for wireless connection is provided, including: at least one processor; and a computer readable storage, coupled to the at least one processor and storing at least one computer executable instructions thereon, which when the at least one computer executable instructions is executed by the at least one processor, cause the at least one processor to carry out following actions: when the first terminal device is in a screen-off state, receiving a first trajectory, the first trajectory indicating a trajectory of a first gesture; determining whether a second trajectory for a second terminal device is matched with the first trajectory, the second trajectory indicating a trajectory of a second gesture; and in response to the determination that the second trajectory is matched with the first trajectory, establishing a wireless connection between the first terminal device and the second terminal device.

In at least one alternative embodiment, a non-transitory computer-readable storage medium is provided, on which a computer program is stored, wherein the computer program is executed by a processor to carry out following actions: when a first terminal device is in a screen-off state, receiving a first trajectory, the first trajectory indicating a trajectory of a first gesture; determining whether a second trajectory for a second terminal device is matched with the first trajectory, the second trajectory indicating a trajectory of a second gesture; and establishing a wireless connection between the first terminal device and the second terminal device, in response to the determination that the second trajectory is matched with the first trajectory.

Figure 1:
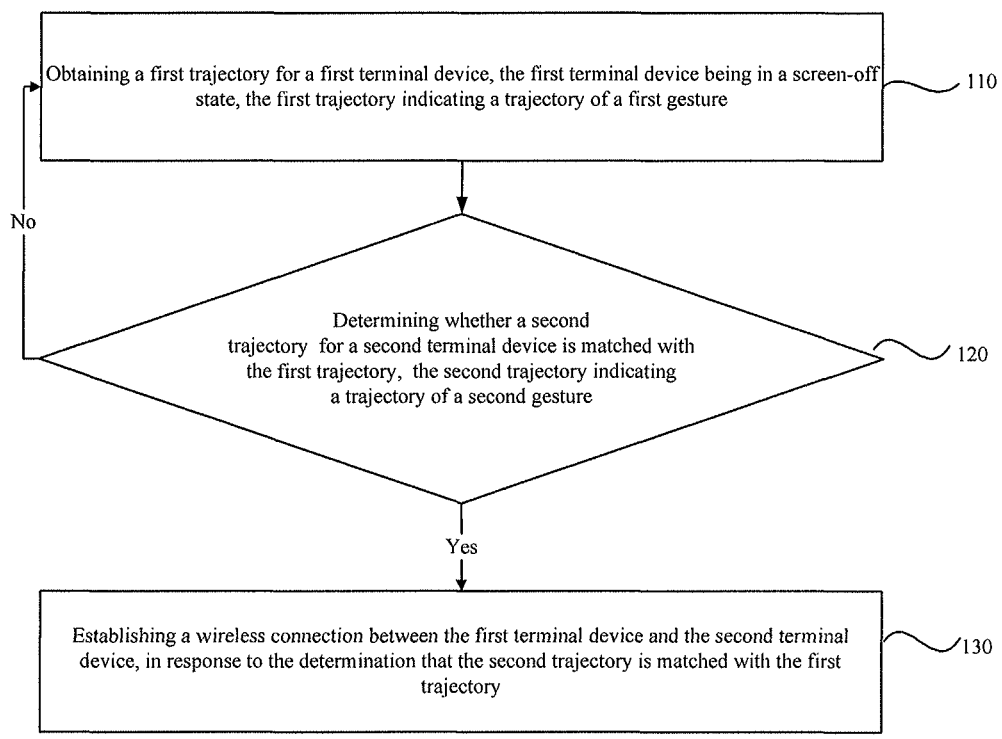
FIG. 1 is a flowchart illustrating a Bluetooth connection method in accordance with an embodiment of the disclosure.

DETAILED DESCRIPTION OF THE
EMBODIMENTS

The disclosure will further be described below in combination with the drawings and embodiments in detail. It can be understood that specific embodiments described herein are adopted not to limit the disclosure but only to explain the disclosure. In addition, it is also important to note that, for convenient description, not all but only part of structures related to the disclosure are shown in the drawings.

In below embodiments or examples, the Bluetooth connection is taken as an example of the wireless connection, and the embodiments and the examples also may be applied for other wireless connection. Further, in below embodiments or examples, the mobile terminal is taken as an example of the terminal device, and the embodiments and the examples also may be applied for other terminal device.

At present, a Bluetooth connection manner is that: a user executes a Bluetooth pairing operation on a Bluetooth connection interface after unlocking a terminal, and two pieces of Bluetooth equipment which are successfully paired establish a Bluetooth connection. However, a present Bluetooth connection operation is more cumbersome and the Bluetooth connection efficiency is low.

According to the embodiments of the disclosure, in a screen-off mode, a trajectory input by a user may be determined as a triggering signal for a Bluetooth connection, and then the user is not required to turn on a screen and enters onto a Bluetooth connection interface, so that multiple user operation blocks are avoided, the Bluetooth pairing can further be rapidly implemented, and the Bluetooth connection efficiency is improved.

FIG. 1 is a flowchart illustrating a wireless connection method in accordance with an embodiment of the disclosure. The embodiment may be applied to the condition of Bluetooth pairing connection of two mobile terminals. The method may be executed by a mobile terminal with a Bluetooth function, wherein the mobile terminal with the Bluetooth function may be a smart phone, smart wearable equipment, a tablet computer or the like. The method includes the following operations in blocks illustrated in FIG. 1.

At block 110, a first trajectory for a first terminal device is obtained, the first terminal device being in a screen-off state, the first trajectory indicating a trajectory of a first gesture.

In an example of above operation at block 110, when a first mobile terminal is in a screen-off state, a first trajectory input by a user is received, and the first trajectory indicates a trajectory of a first gesture. In the above and below mentioned embodiments or examples, the operation of receiving the first trajectory input by a user is taken as an example of the operation of obtaining the first trajectory for the first terminal device, and the embodiments and the examples also may be applied for other example of the operation of obtaining the first trajectory for the first terminal device. Furthermore, the first trajectory input by a user is taken as an example of the first trajectory for a first terminal device, and the embodiments and the examples also may be applied for other example of the first trajectory for the first terminal device.

In an alternative embodiment, the screen-off state may be a state of the mobile terminal after a screen of the mobile terminal is turned off. When the screen is turned off, a working state of a touch screen of the first mobile terminal is related to an acquiring manner of the first trajectory, and the following two acquiring manners are included.

There may be many manners for obtaining the first trajectory for the first terminal device, for example, a manner for receiving the first trajectory input by the user may be that a first sliding trajectory input by the user is received by the touch screen. In the above and below mentioned embodiments or examples, the first sliding trajectory is taken as an example of the first trajectory, and the embodiments and the examples also may be applied for other example of the first trajectory for the first terminal device.

When the first mobile terminal is in the screen-off state, the touch screen may be configured to monitor a sliding trajectory input by the user on the touch screen, wherein the sliding trajectory is set as the first trajectory.

As another example of manners for obtaining the first trajectory for the first terminal device, the manner for receiving the first trajectory input by the user may further be that a first movement trajectory input by the user is acquired by an acceleration sensor, wherein the first movement trajectory is a movement trajectory of the first mobile terminal. In the above and below mentioned embodiments or examples, the first movement trajectory is taken as an example of the first trajectory, and the embodiments and the examples also may be applied for other example of the first trajectory for the first terminal device. The movement trajectory may be a movement trajectory in the air, and may also be a movement trajectory on a plane such as a desktop. When the first mobile terminal is in the screen-off state, the touch screen is turned off, and the movement trajectory, vibration frequency or the like of the mobile terminal is acquired by a gyroscope, the acceleration sensor or the like, and then to obtain the first trajectory.

Figure 2:
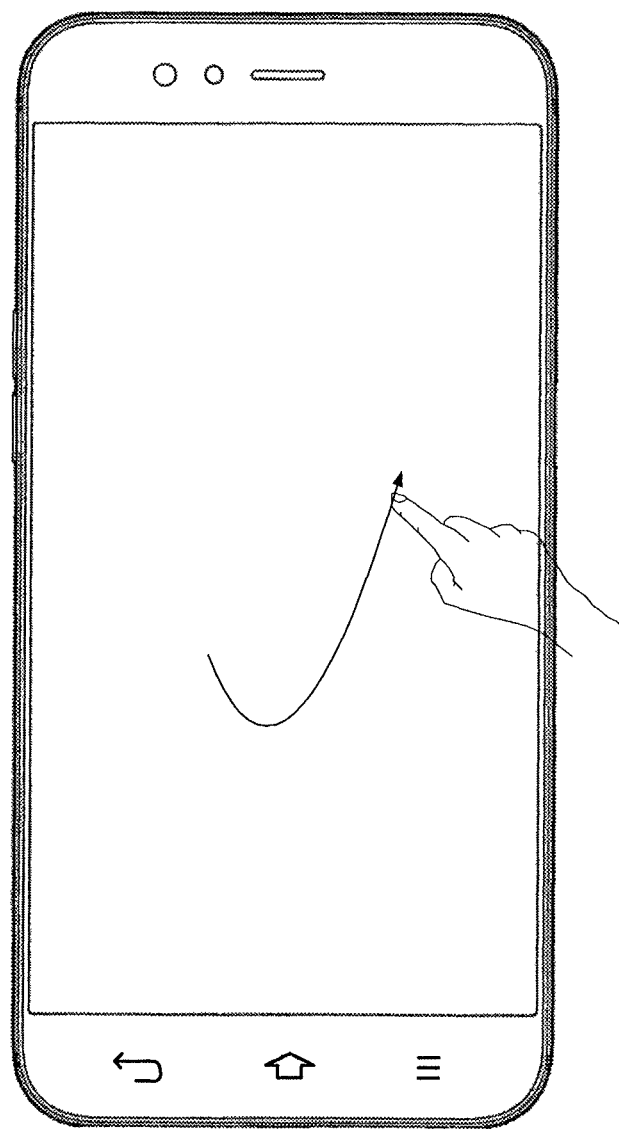
FIG. 2 is a schematic diagram illustrating a trajectory in accordance with another embodiment of the disclosure.
Figure 3:
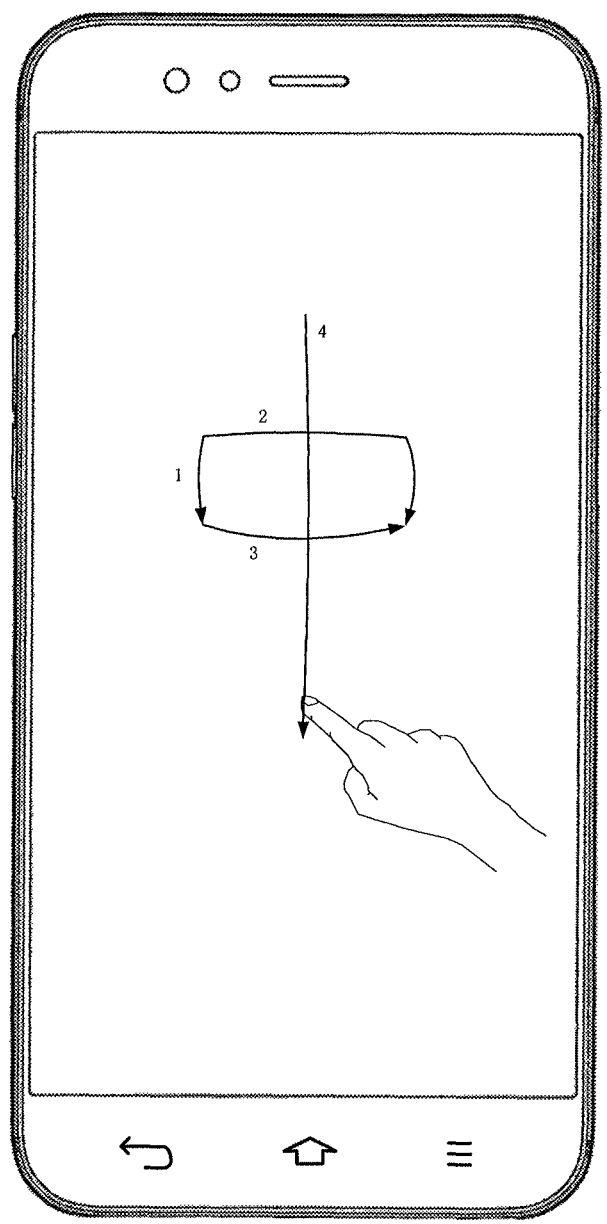
FIG. 3 is a schematic diagram illustrating another trajectory in accordance with another embodiment of the disclosure.

The first trajectory input by the user may be a one-time input trajectory shown in FIG. 2. For example, a check mark is drawn by a trajectory in FIG. 2. The user may also input a character formed by multiple strokes. The character may be an English character and may also be a Chinese character. For example, a Chinese character "Zhong" is written by four strokes in FIG. 3. For another example, the user inputs a figure formed by multiple strokes, for example, a polygon and a cross. At this moment, when merely one trajectory is identified, there may appear an error. For solving the problem, the embodiment provides the following solution.

At first, when the first terminal is in the screen-off state, at least one continuous first sub-trajectory input by the user is received; and then the first trajectory is determined according to the at least one continuous first sub-trajectory. In the above and below mentioned embodiments or examples, the at least one continuous first sub-trajectory input by the user is taken as an example of the at least one continuous first sub-trajectory of the user, and the embodiments and the examples also may be applied for other example of the at least one continuous first sub-trajectory of the user.

For a combined trajectory, each coherent trajectory may be determined as one first sub-trajectory. After the touch screen detects that the user inputs first sub-trajectories, when there is no new first sub-trajectory input in a preset input time interval threshold value from an input ending moment of the first sub-trajectories, a set of the acquired first sub-trajectories is determined as the first trajectory.

Furthermore, the obtained first trajectory may be analyzed, and when the first trajectory is a character trajectory, a character code corresponding to the character trajectory may be found. The character code is determined as the first trajectory. The character code may be an American Standard Code for Information Interchange (ASCII).

At block 120, whether a second trajectory for a second terminal device is matched with the first trajectory is determined, the second trajectory indicating a trajectory of a second gesture.

In an example of above operation at block 120, whether a target mobile terminal exists or not is determined, and in an alternative embodiment, the target mobile terminal is a second mobile terminal receiving a second trajectory matched with the first trajectory. In the above and below mentioned embodiments or examples, the operation of determining whether the target mobile terminal exists or not is taken as an example of the operation of determining whether the second trajectory for the second terminal device is matched with the first trajectory, and the embodiments and the examples also may be applied for other example of the operation of determining whether the second trajectory for the second terminal device is matched with the first trajectory. Furthermore, the second trajectory for a second terminal device may be a trajectory input by a user, the second trajectory input by the user is taken as an example of the second trajectory for the second terminal device, and the embodiments and the examples also may be applied for other example of the second trajectory for the second terminal device.

A manner for obtaining the second trajectory by the second mobile terminal is the same as the manner for obtaining the first trajectory by the first mobile terminal and may refer to descriptions at block 110.

In an implementation mode, a connected network is searched for the second mobile terminal, the second mobile terminal sends the received second trajectory to the first mobile terminal, and the first mobile terminal determines whether the second trajectory is matched with the first trajectory or not. When a determining result is that the second trajectory is matched with the first trajectory, the second mobile terminal providing the matched trajectory is determined as the target mobile terminal, and it is determined that the target mobile terminal exists.

Furthermore, in an alternative embodiment, the operation of determining whether the first trajectory is matched with the second trajectory or not may be implemented in the at least one of the following manners: 1) as an alternative manner, when the difference between the first trajectory and the second trajectory is smaller than a preset threshold, it is determined that the second trajectory for the second terminal device is matched with the first trajectory, wherein the condition that the difference between the first trajectory and the second trajectory is smaller than a preset threshold may comprise that the second trajectory received by the second mobile terminal is the same as the first trajectory; 2) as another alternative manner, when the second trajectory for the second terminal device is symmetric with the first trajectory, it is determined that the second trajectory for the second terminal device is matched with the first trajectory. In an example of above manner 2), when the second trajectory received by the mobile terminal is symmetric with the first trajectory, it is determined that the first trajectory is matched with the second trajectory.

Exemplarily, a first touch screen of the first mobile terminal acquires a first sliding trajectory input by a first user on the first touch screen. A second touch screen of the second mobile terminal acquires a second sliding trajectory input by a second user on the second touch screen. When the second trajectory and the first trajectory correspond to the same shape, it is determined that the first trajectory is matched with the second trajectory. Or, when the second trajectory and the first trajectory correspond to the same character, it is determined that the first trajectory is matched with the second trajectory. Or, when the second trajectory and the first trajectory correspond to the same coordinate point sequence, it is determined that the first trajectory is matched with the second trajectory.

Exemplarily, the first mobile terminal is shaken by the first user according to a first frequency, and the second mobile terminal is shaken by the second user according to a second frequency. When the first frequency is the same as the second frequency or difference between the first frequency and the second frequency is less than a preset threshold, it is determined that the first trajectory is matched with the second trajectory.

Exemplarily, the first mobile terminal is moved by the first user according to a first trajectory, and the second mobile terminal is moved by the second user according to a second trajectory. When the first trajectory is the same as the second trajectory, or difference between the first trajectory and the second trajectory is less than a preset threshold, it is determined that the first trajectory is matched with the second trajectory. Or, when the first trajectory is symmetric with the second trajectory, it is determined that the first trajectory is matched with the second trajectory. In an alternative embodiment, a user may hold, with one hand, two mobile terminals required to be paired, and each mobile terminal is in the screen-off state. The user moves the hand with the mobile terminals in the air, at this moment, movement trajectories of the two mobile terminals are the same movement trajectories, and it is further determined that the first trajectory is matched with the second trajectory.

For example, the operation of determining whether a second trajectory for a second terminal device is matched with the first trajectory may comprise: a wireless link key of the first terminal device is generated according to the first trajectory; and when a wireless link key sent by the second terminal device is matched with the wireless link key of the first terminal device, it is determined that the second trajectory for the second terminal device is matched with the first trajectory, the wireless link key sent by the second terminal device being a link key generated according to the second trajectory for the second terminal device.

By taking a Bluetooth link key as an example of the wireless link key, a first Bluetooth link key may be generated according to the first trajectory. Then, the second mobile terminal also generates a second Bluetooth link key of the second mobile terminal according to the received second trajectory. When searching for a paired mobile terminal, the first mobile terminal performs decryption pairing with more than one second mobile terminals by virtue of the generated first Bluetooth link key. When the second mobile terminal with a second Bluetooth link key which is the same as the first Bluetooth link key is found, the second mobile terminal is determined as the target mobile terminal, and it is determined that the target mobile terminal exists.

In the above and below mentioned embodiments or examples, a Bluetooth link key is taken as an example of the wireless link key, and the embodiments and the examples also may be applied for other example of the wireless link key.

Furthermore, when a character code corresponding to the first trajectory is the same as a character code corresponding to the second trajectory, it is determined that the target mobile terminal exists. Or, the Bluetooth pairing identification is performed by setting the character code corresponding to the first trajectory as the first Bluetooth link key and setting the character code corresponding to the second trajectory as the second Bluetooth link key.

When the target mobile terminal exists, block 130 is executed. When the target mobile terminal does not exist, block 110 is re-executed. When the target mobile terminal does not exist, block 110 is re-executed to monitor the first trajectory until the user turns on the screen through a screen turning-on button and the like.

At block 130, a wireless connection between the first terminal device and the second terminal device is established, in response to the determination that the second trajectory is matched with the first trajectory.

In an example of above operation at block 130, when the target mobile terminal exists, a Bluetooth connection is established between the first mobile terminal and the target mobile terminal.

In the above and below mentioned embodiments or examples, the operation of establishing a Bluetooth connection between the first mobile terminal and the target mobile terminal when the target mobile terminal exists is taken as an example of the operation of establishing the wireless connection between the first terminal device and the second terminal device, in response to the determination that the second trajectory is matched with the first trajectory, and the embodiments and the examples also may be applied for other example of the operation of establishing the wireless connection between the first terminal device and the second terminal device, in response to the determination that the second trajectory is matched with the first trajectory.

After the target terminal is found, the first mobile terminal is determined as master equipment, and the second mobile terminal is determined as slave equipment. The master equipment may be equipment initiating a request of establishing connection, and the slave equipment may be equipment receiving the request of establishing connection.

The master equipment pages the slave equipment. The master equipment pages the slave equipment in a frequency hopping manner, and the slave equipment scans an external page at a fixed interval, i.e., page scan. When an external page is scanned, the slave equipment responds to the external page, and in such a manner, a link connection, i.e., a Bluetooth physical link (Asynchronous Connectionless, ACL link) connection, may be established between the master equipment and the slave equipment. After the ACL link connection is established, the master equipment may initiate a channel connection request, i.e., a Logical Link Control and Adaptation Protocol (L2CAP) connection. After the L2CAP connection is established, the master equipment adopts a Session Description Protocol (SDP) to query handsfree service of the slave equipment to obtain an rfcomm channel number therefrom, and then the master equipment may initiate an rfcomm connection request to establish an rfcomm connection. Then, an application connection is established.

According to the Bluetooth connection method provided by the embodiment, when a first mobile terminal is in the screen-off state, the target mobile terminal may be searched for according to the first trajectory input by the user, and the Bluetooth connection is established between the first mobile terminal and the target mobile terminal. In the related technology, the user is required to turn on the screen at first, then the screen is unlocked, and the user starts the Bluetooth connection. In the embodiment, the user is not required to turn on the screen, and when two mobile terminals are in the screen-off state, users of the two mobile terminals input matched trajectories into the two mobile terminals respectively, the two mobile terminals may establish a Bluetooth connection. Therefore, the user operation blocks for Bluetooth connection are reduced, and the Bluetooth connection efficiency is improved.

Figure 4:
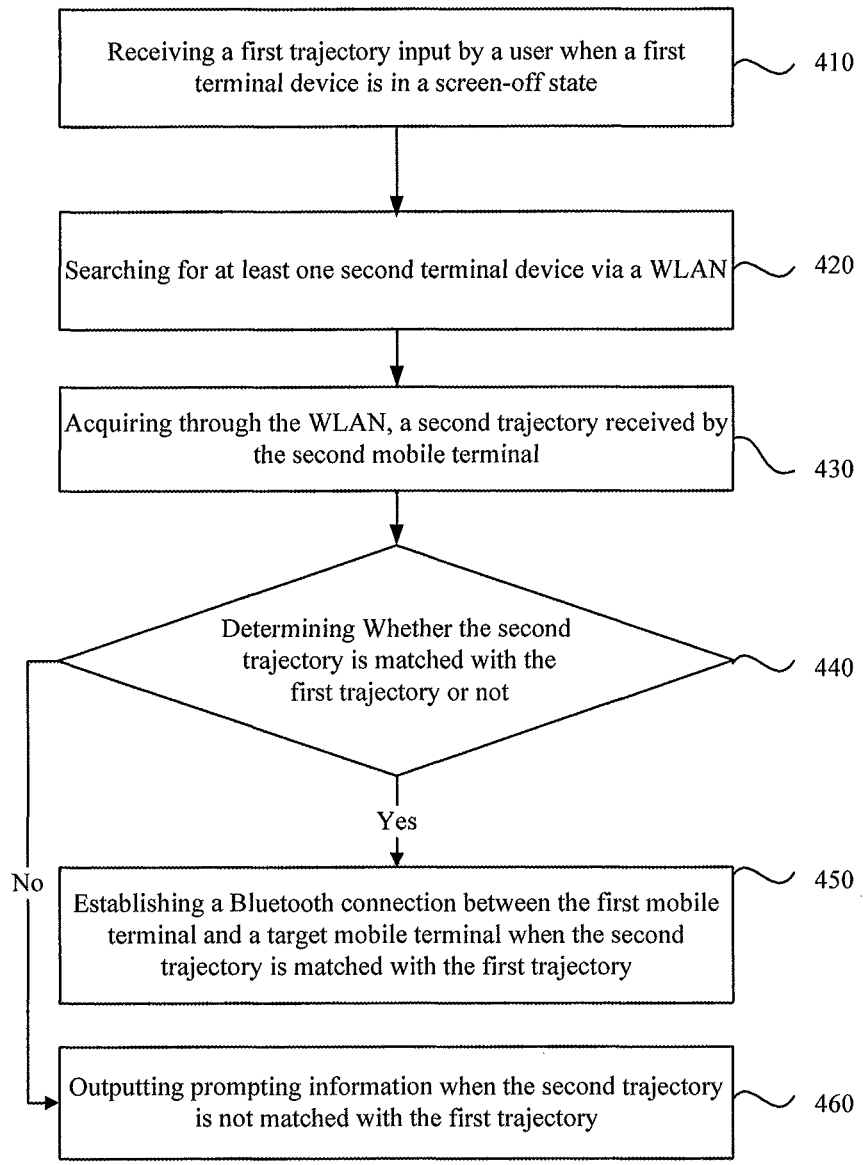
FIG. 4 is a flowchart illustrating another Bluetooth connection method in accordance with another embodiment of the disclosure.

The embodiment will further be described below with an application scenario. As shown in FIG. 4, the following blocks are included.

At block 410, when a first terminal device is in a screen-off state, a first trajectory input by a user is received.

Reception of the first trajectory may refer to explanations about block 110.

At block 420, the second terminal device is searched for via a WLAN, for an alternative embodiment, at least one second mobile terminal is searched for via the WLAN.

The WLAN may be a WLAN to which a first mobile terminal has been connected. The WLAN may have an Internet access function, the WLAN may also be a local WLAN. The WLAN may be the Wi-Fi (Wireless Fidelity).

The first mobile terminal may acquire, by the connected WLAN, one or more second mobile terminal also connected to the WLAN.

At block 430, a second trajectory received by the second mobile terminal is acquired through the WLAN.

The second trajectory in each second mobile terminal may be sequentially acquired. The second trajectories of more than one second mobile terminal may also be acquired at one time, and then the matching identification is performed, locally in the first mobile terminal, on the more than one second trajectories respectively.

In at least one alternative embodiment, the first mobile terminal sends a trajectory sending request to the second mobile terminal in the screen-off state in the WLAN. When receiving the trajectory sending request, the second mobile terminal determines whether the second trajectory input by a second user has been received or not. When the second trajectory is received, the second mobile terminal sends the second trajectory to the first mobile terminal.

In at least one alternative embodiment, when any mobile terminal (for example, the second mobile terminal) in the WLAN receives a trajectory input by the user, the trajectory is sent to another mobile terminal in the screen-off state. The another mobile terminal (for example, the first mobile terminal) in the screen-off state determines whether two trajectories are matched or not according to the received trajectory and a trajectory received by the another mobile terminal and input by the user.

At block 440, whether the second trajectory is matched with the first trajectory or not is determined.

At block 450, when the second trajectory is matched with the first trajectory, a Bluetooth connection is established between the first mobile terminal and a target mobile terminal.

The target mobile terminal is a second mobile terminal corresponding to the second trajectory matched with the first trajectory. Details about a process of establishing the Bluetooth connection between the first mobile terminal and the target mobile terminal refer to explanations about block 130.

At block 460, when the second trajectory is not matched with the first trajectory, prompting information is output.

In at least one alternative embodiment, when the second trajectory is not matched with the first trajectory, the screen is turned on, and the prompting information is displayed on the screen, wherein the prompting information is configured to prompt to the user that a Bluetooth connection failed.

According to the embodiment, the second trajectory may be rapidly acquired by the WLAN to which the first mobile terminal has been connected. Since the communication speed of the WLAN is relatively higher and the network signal of the WLAN is stable, a Bluetooth connection rate and reliability may be improved.

Figure 5:
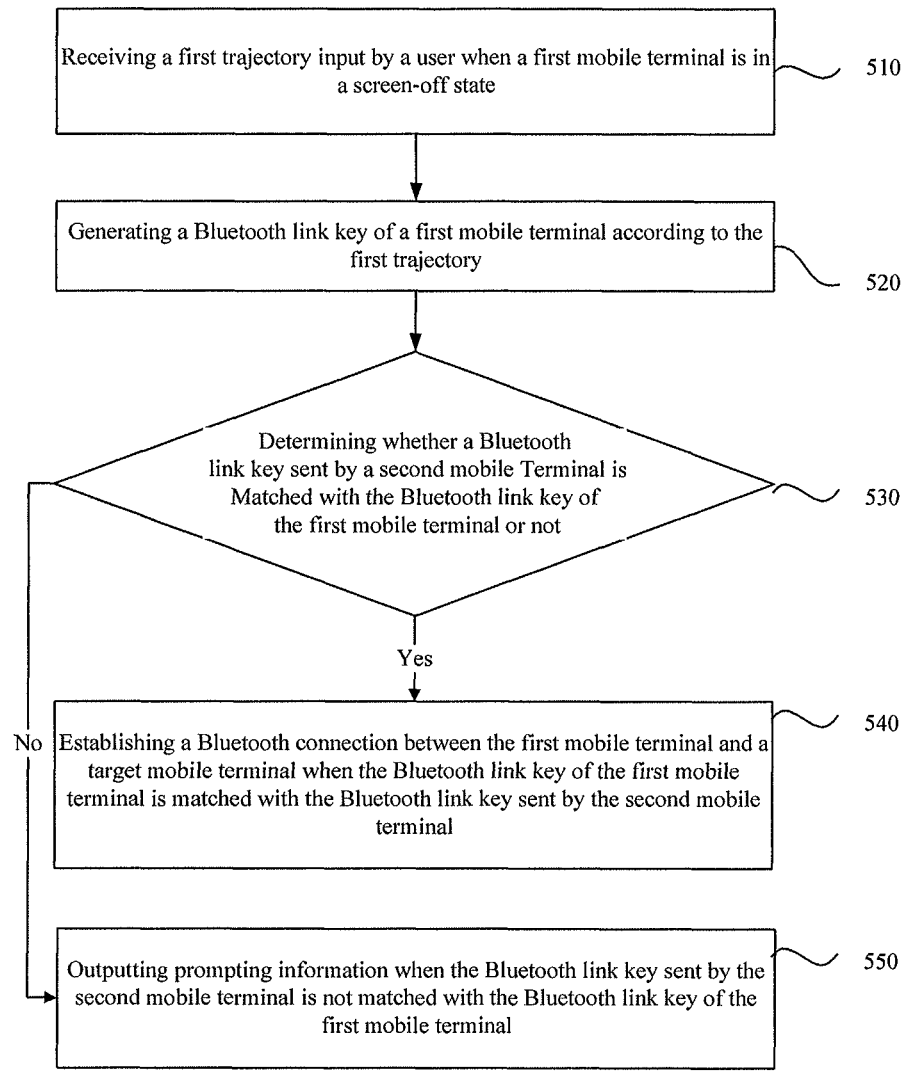
FIG. 5 is a flowchart illustrating another Bluetooth connection method in accordance with another embodiment of the disclosure.

The embodiment will further be described below with another application scenario. As shown in FIG. 5, the following blocks are included.

At block 510, when a first mobile terminal is in a screen-off state, a first trajectory input by a user is received.

Reception of the first trajectory may refer to explanations about block 110.

At block 520, a Bluetooth link key of a first mobile terminal is generated according to the first trajectory.

Different manners for generating the Bluetooth link key may be adopted according to different types of first trajectories.

In an implementation mode, an inflection point of the first trajectory is searched for according to a coordinate set corresponding to the first trajectory. The Bluetooth link key of the first mobile terminal is generated according to a coordinate of the inflection point.

Exemplarily, when a type of the first trajectory is a movement trajectory of the terminal in the air, a processor of the first mobile terminal draws a controlled movement trajectory according to an acceleration direction detected by an acceleration sensor. A corresponding three-dimensional space coordinate set is obtained according to the drawn controlled movement trajectory. The Bluetooth link key is generated according to the three-dimensional space coordinate set. Or, multiple inflection point coordinates in the movement trajectory are acquired, and the Bluetooth link key is generated according to the inflection point coordinates.

Exemplarily, it is supposed that the first trajectory is a sliding trajectory input by the user on a touch screen, and then the processor of the first mobile terminal detects a sliding trajectory according to the touch screen. The Bluetooth link key is generated according to a two-dimensional coordinate set corresponding to the sliding trajectory. Or, an inflection point in the sliding trajectory is acquired, and the Bluetooth link key is generated according to a coordinate of the acquired inflection point.

In another implementation mode, an image identifier corresponding to the first trajectory is generated according to a coordinate set corresponding to the first trajectory; and a wireless link key of the first mobile terminal is generated according to the image identifier.

In an alternative embodiment, above operation of generating according to a coordinate set corresponding to the first trajectory, an image identifier corresponding to the first trajectory may comprise: generating a trajectory image corresponding to the first trajectory according to the coordinate set corresponding to the first trajectory; and generating the image identifier corresponding to the generated trajectory image according to a relationship between the image identifier and the trajectory image;

In an alternative embodiment, above operation of generating the wireless link key of the first terminal device according to the image identifier may comprise at least one of: when the image identifier is a digit, setting the digit as the wireless link key of the first terminal device; and converting the image identifier according to a preset encryption algorithm to obtain the wireless link key of the first terminal device.

A trajectory image corresponding to the first trajectory may be drawn according to the coordinate set corresponding to the first trajectory. In the above and below mentioned embodiments or examples, the operation of drawing the trajectory image corresponding to the first trajectory according to the coordinate set corresponding to the first trajectory is taken as an example of the operation of generating the trajectory image corresponding to the first trajectory according to the coordinate set corresponding to the first trajectory, and the embodiments and the examples also may be applied for other example of the operation of generating the trajectory image corresponding to the first trajectory according to the coordinate set corresponding to the first trajectory.

By taking a Bluetooth link key as an example of the wireless link key, the image identifier corresponding to the first trajectory may be acquired according to the trajectory image. The image identifier corresponds to the trajectory image one to one. The image identifier may be a digit, and at this moment, the image identifier may be determined as the Bluetooth link key of the first mobile terminal. Or, the image identifier is converted through a preset encryption algorithm to obtain the Bluetooth link key of the first mobile terminal. The conversion may comprise the operation of filling, when the number of digits is less than the minimum number of a key, a digit to make the number of digits reach the minimum number of the key. The conversion may also comprise the operation of encrypting the image identifier through the encryption algorithm such as Data Encryption Standard (DES) to obtain the Bluetooth link key of the first mobile terminal.

At block 530, whether a Bluetooth link key sent by a second mobile terminal is matched with the Bluetooth link key of the first mobile terminal or not is determined.

In the example embodiment, the Bluetooth link key sent by the second mobile terminal is a connection key generated according to a second trajectory received by the second mobile terminal.

A manner for generating the Bluetooth link key by the second mobile terminal according to the second trajectory is the same as the manner for generating the Bluetooth link key of the first mobile terminal at block 520.

In at least one alternative embodiment, when the Bluetooth link key sent by the second mobile terminal is the same as the Bluetooth link key of the first mobile terminal, it is determined that the Bluetooth link key of the first mobile terminal is matched with the Bluetooth link key sent by the second mobile terminal.

At block 540, when the Bluetooth link key of the first mobile terminal is matched with the Bluetooth link key sent by the second mobile terminal, a Bluetooth connection is established between the first mobile terminal and a target mobile terminal.

The target mobile terminal is a second mobile terminal corresponding to the second trajectory matched with the first trajectory. Details about a process of establishing the Bluetooth connection between the first mobile terminal and the target mobile terminal refer to explanations about block 130.

At block 550, when the Bluetooth link key of the first mobile terminal is not matched with the Bluetooth link key sent by the second mobile terminal, prompting information is output.

When the Bluetooth link key of the first mobile terminal is not matched with the Bluetooth link key sent by the second mobile terminal, the screen is turned on, and the prompting information is displayed on the screen, wherein the prompting information is configured to prompt to the user that a Bluetooth connection failed.

According to the embodiment, the first mobile terminal and the second mobile terminal may generate the corresponding Bluetooth link key of the first mobile terminal and Bluetooth link key sent by the second mobile terminal according to the respectively received trajectories when the first mobile terminal and the second mobile terminal do not have WLAN connections, so that usability is improved.

In the embodiment, a user input event detected when the mobile terminal is in the screen-off state may be called as a screen-off gesture event. The screen-off gesture event may be an event pre-negotiated by a driver layer and an application layer and configured to represent that a screen-off gesture is input.

A screen-off gesture may be a touch gesture input by the user on the touch screen of the mobile terminal in the screen-off state after a screen-off gesture function is enabled. It can be understood that the screen-off gesture is not limited to the touch gesture input on the touch screen and may also be an operation and the like detected by a sensor of the mobile terminal, for example, a gesture of shaking a smart phone leftwards and rightwards, a gesture of waving over a touch screen of the smart phone, and a gesture of pressing a frame of the smart phone.

Figure 6:
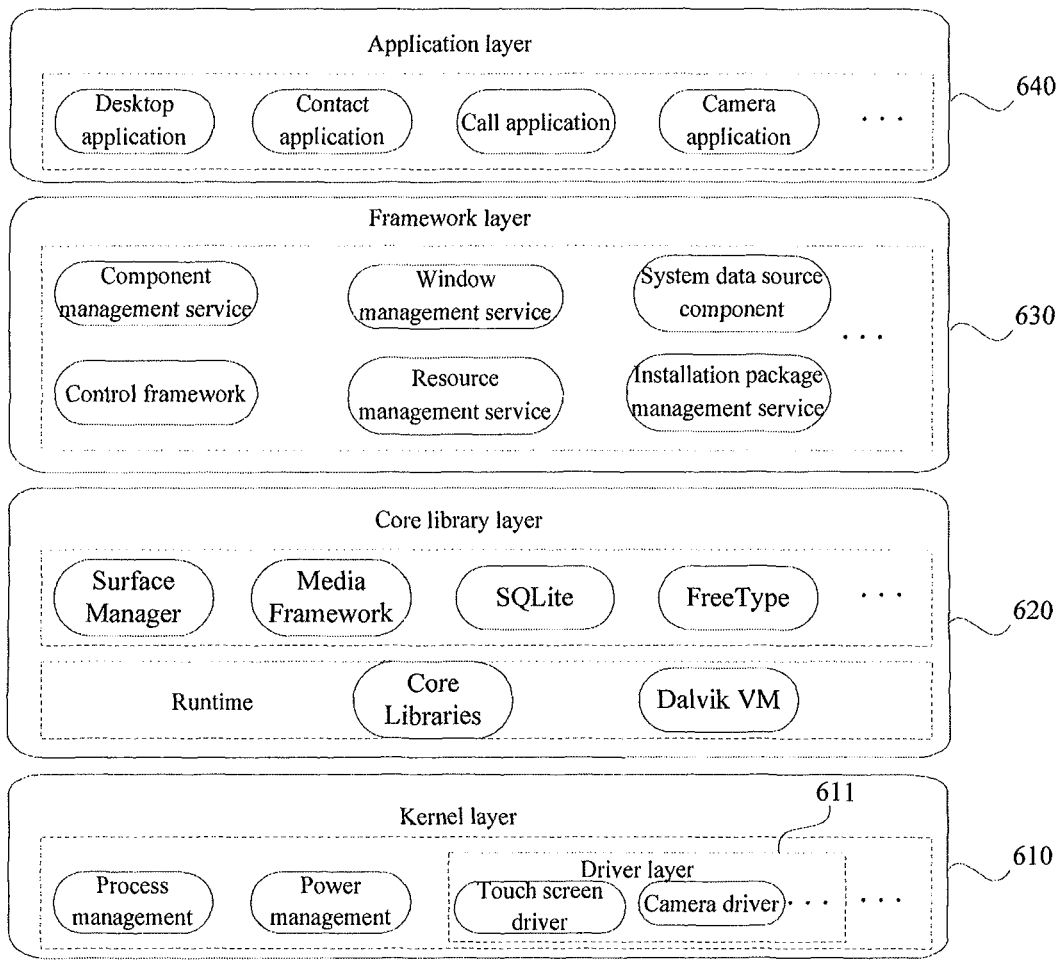
FIG. 6 is a schematic diagram illustrating an Android system framework in accordance with another embodiment of the disclosure.

FIG. 6 is a schematic diagram illustrating an Android system framework in accordance with another embodiment of the disclosure. An execution flow of a screen-off gesture function provided by the embodiment of the disclosure will be introduced by taking a mobile terminal as an example, wherein an operating system of the mobile terminal is an Android system shown in FIG. 6. As shown in FIG. 6, the Android system framework from bottom to top includes a kernel layer 610, a core library layer 620, a framework layer 630 and an application layer 640, wherein the kernel layer 610 provides core system service, including security, memory management, process management, a network protocol stack, a hardware driver and the like. The hardware driver in the kernel layer 610 is recorded as a driver layer 611, and the driver layer 611 includes a touch screen driver, a camera driver and the like. The core library layer 620 includes Android running environment (Android Runtime) and libraries (Libraries), wherein the Android Runtime provides most of functions available in Java programming language core libraries, including core libraries (Core Libraries) and a Dalvik Virtual Machine (Dalvik VM). Each Android application program is an example in the Dalvik VM and is run in its own process. The libraries are used for each component of the Android system and include the following functions: a media library (Media Framework), surface management (Surface Manager), an relational database engine (SQLite), bitmap and vector font rendering (FreeType) and the like, and each function is exposed to developers for use through the framework layer 630 of the Android system. The framework layer 630 provides a series of libraries required by the development of the Android application programs to enable the developer to rapidly develop the application programs, conveniently reuse the components and implement personalized extension by inheritance, and provides services including component management service, window management service, a system data source component, a spatial framework, resource management service, installation package management service and the like. The application layer 640 includes various kinds of application programs directly interacting with a user or service programs written with a Java language and running in background, including programs such as a desktop application, a contact application, a call application, a camera application, a picture viewer, a game, a map and a web browser, and other application programs developed by the developers.

Exemplarily, after the screen-off gesture function is enabled, a touch chip generates a wakeup signal when detecting a screen-off gesture, and sends the wakeup signal to the kernel layer. The kernel layer is triggered by the wakeup signal to execute a system wakeup operation. After the system is woken up, the kernel layer calls an interruption function of the driver layer to execute an operation of reading gesture data in the touch chip, and stores the read gesture data in a preset node of the driver layer, wherein the preset node may be a file node, and for example, may be a virtual file node under a proc-D directory. After the data reading is completed, the driver layer determines validity of the gesture data. There are many manners for determining the validity, which will not be limited in the embodiment. For example, the driver layer determines a gesture type according to coordinate information included in the gesture data and stores the determined gesture type in the preset node as the gesture data. When the gesture type is not a preset screen-off gesture, it is determined that the gesture data is invalid. For another example, the driver layer counts the number of the gesture data, determines whether the number meets a requirement of drawing the preset screen-off gesture or not, and when the number does not meet the requirement of drawing the preset screen-off gesture, determines that the gesture data is invalid. When the gesture data is valid, the driver layer reports a screen-off gesture event. The screen-off gesture event is transmitted to the framework layer through the core library layer, and is dispatched to the application layer through the framework layer. The application layer reads the gesture data from the preset node of the driver layer when acquiring the screen-off gesture event.

After the gesture data is completely prepared, a screen-off gesture trajectory is calculated according to the coordinate information included in the gesture data, and the screen-off gesture trajectory is drawn on a display screen for display. Then, the application layer starts an application program corresponding to a gesture in the read gesture data on the basis of the gesture, wherein the gesture may be a gesture configured to realize a certain function and preset in the mobile terminal, and may also be a user-defined gesture. For example, a type of a gesture may be 0 and represents starting a camera. For example, a type of a gesture may be V and represents starting a flashlight and the like.

Figure 7:
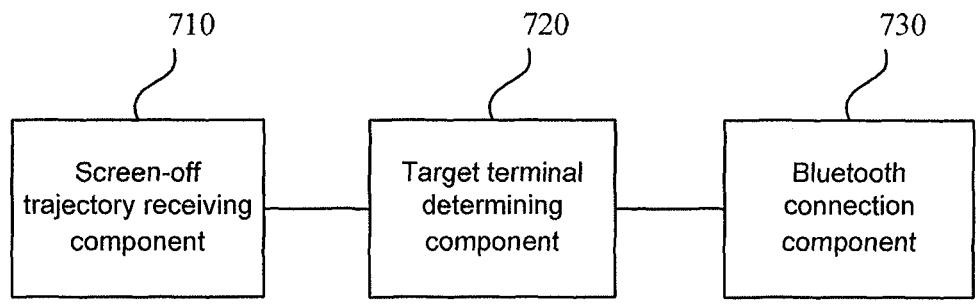
FIG. 7 is a structure schematic diagram illustrating a Bluetooth connection device in accordance with another embodiment of the disclosure.

FIG. 7 is a structure schematic diagram illustrating a Bluetooth connection device in accordance with another embodiment of the disclosure. As mentioned in the above method, in below device embodiments or examples, the Bluetooth connection is taken as an example of the wireless connection, and the embodiments and the examples also may be applied for other wireless connection. Further, in below device embodiments or examples, the mobile terminal is taken as an example of the terminal device, and the embodiments and the examples also may be applied for other terminal device.

The device is configured to implement the method of the abovementioned embodiments, and the device is located in a mobile terminal and includes:

a screen-off trajectory receiving component 710, configured to, receive a first trajectory input by a user in a screen-off state; a target terminal determining component 720, configured to determine whether a target mobile terminal exists or not, wherein the target mobile terminal is a second mobile terminal receiving a second trajectory matched with the first trajectory received by the screen-off trajectory receiving component 710; and a Bluetooth connection component 730, configured to, when the target terminal determining component 720 determines that the target mobile terminal exists, establish a Bluetooth connection between the mobile terminal and the target mobile terminal.

Furthermore, the screen-off trajectory receiving component 710 is configured to: receive, by a touch screen, a first sliding trajectory input by the user; or, acquire, by an acceleration sensor, a first movement trajectory input by the user, wherein the first movement trajectory is a movement trajectory of the first mobile terminal.

Furthermore, the screen-off trajectory receiving component 710 is configured to: receive at least one continuous first sub-trajectory input by the user in a screen-off state; and determine the first trajectory according to the at least one continuous first sub-trajectory.

Furthermore, the target terminal determining component 720 is configured to: when the second trajectory received by the second mobile terminal is the same as the first trajectory, or when the difference between the first trajectory and the second trajectory is less than a preset threshold, determine that the target mobile terminal exists and determine the second mobile terminal as the target mobile terminal; or, when the second trajectory received by the second mobile terminal is symmetric with the first trajectory, determine that the target mobile terminal exists.

Furthermore, the target terminal determining component 720 is configured to: search for at least one second mobile terminal by a WLAN; acquire, by the WLAN, the second trajectory received by the second mobile terminal; and determine whether the second trajectory is matched with the first trajectory or not.

Furthermore, the target terminal determining component 720 is configured to: generate a Bluetooth link key of the first mobile terminal according to the first trajectory; and determine whether a Bluetooth link key sent by the second mobile terminal is matched with the Bluetooth link key of the first mobile terminal or not, wherein the Bluetooth link key sent by the second mobile terminal is a link key generated according to the second trajectory received by the second mobile terminal.

Furthermore, the target terminal determining component 720 is configured to generate an image identifier corresponding to the first trajectory according to a coordinate set corresponding to the first trajectory and generate the Bluetooth link key of the first mobile terminal according to the image identifier.

According to the Bluetooth connection device provided by the embodiment, the target terminal determining component 720 may search for the target mobile terminal according to the first trajectory input by the user and received by the screen-off trajectory receiving component 710 in the screen-off state, and the Bluetooth connection is established between the first mobile terminal and the target mobile terminal. In the related technology, the user is required to turn on the screen at first, then unlock the screen, and then start the Bluetooth connection. In the embodiment, the user is not required to turn on the screen, and when users of two mobile terminals input matched trajectories into the two mobile terminals in the screen-off state respectively, the two mobile terminals may establish a Bluetooth connection. Therefore, user operation blocks for Bluetooth connection are reduced, and the Bluetooth connection efficiency is improved.

The device may execute the method provided by all of the abovementioned embodiments of the disclosure and has functional components and beneficial effects corresponding to the method. Technical details which are not elaborated in the embodiment may refer to the method provided by all of the abovementioned embodiments of the disclosure.

In an alternative embodiment, a first terminal device for wireless connection is provided. The first terminal device may comprise: at least one processor; and a computer readable storage, coupled to the at least one processor and storing at least one computer executable instructions thereon, which when the at least one computer executable instructions is executed by the at least one processor, cause the at least one processor to carry out following actions: when the first terminal device is in a screen-off state, receiving a first trajectory, the first trajectory indicating a trajectory of a first gesture; determining whether a second trajectory for a second terminal device is matched with the first trajectory, the second trajectory indicating a trajectory of a second gesture; and in response to the determination that the second trajectory is matched with the first trajectory, establishing a wireless connection between the first terminal device and the second terminal device.

In at least one alternative embodiment, the determining whether a second trajectory for a second terminal device is matched with the first trajectory may comprise: receiving, from the second terminal device, the second trajectory; and determining by the first terminal device, whether the second trajectory for the second terminal device is matched with the first trajectory for the first terminal device.

In at least one alternative embodiment, the first terminal device may further comprise at least one of: a touch screen, configured to receive a first sliding trajectory of a user; and an acceleration sensor, configured to acquire a first movement trajectory of the user, wherein the first movement trajectory is a movement trajectory of the first terminal device.

In at least one alternative embodiment, receiving a first trajectory may comprise: receiving at least one continuous first sub-trajectory of a user; and determining the first trajectory according to the at least one continuous first sub-trajectory.

In at least one alternative embodiment, determining whether a second trajectory for a second terminal device is matched with the first trajectory may comprise: when the difference between the first trajectory and the second trajectory is smaller than a preset threshold, determining that the second trajectory for the second terminal device is matched with the first trajectory; and when the second trajectory for the second terminal device is symmetric with the first trajectory, determining that the second trajectory for the second terminal device is matched with the first trajectory.

In at least one alternative embodiment, determining whether a second trajectory for a second terminal device is matched with the first trajectory may comprise: searching for the second terminal device via a WLAN; acquiring, via the WLAN, the second trajectory for the second terminal device; and determining whether the second trajectory for the second terminal device is matched with the first trajectory.

In at least one alternative embodiment, determining whether a second trajectory for a second terminal device is matched with the first trajectory may comprise: generating a Bluetooth link key of the first terminal device according to the first trajectory; and when a wireless link key sent by the second terminal device is matched with the wireless link key of the first terminal device, determining that the second trajectory for the second terminal device is matched with the first trajectory, the wireless link key sent by the second terminal device being a link key generated according to the second trajectory for the second terminal device.

In at least one alternative embodiment, generating a wireless link key of the first terminal device according to the first trajectory may comprise: generating, according to a coordinate set corresponding to the first trajectory, an image identifier corresponding to the first trajectory; and generating the wireless link key of the first terminal device according to the image identifier.

In an alternative embodiment, a non-transitory computer-readable storage medium is provided. As mentioned in the above method, in below embodiments or examples of the non-transitory computer-readable storage medium, the Bluetooth connection is taken as an example of the wireless connection, and the embodiments and the examples also may be applied for other wireless connection. Further, in below embodiments or examples of the non-transitory computer-readable storage medium, the mobile terminal is taken as an example of the terminal device, and the embodiments and the examples also may be applied for other terminal device. On the non-transitory computer-readable storage medium, a computer program is stored, wherein the computer program is executed by a processor to carry out following actions: when a first terminal device is in a screen-off state, receiving a first trajectory, the first trajectory indicating a trajectory of a first gesture; determining whether a second trajectory for a second terminal device is matched with the first trajectory, the second trajectory indicating a trajectory of a second gesture; and establishing a wireless connection between the first terminal device and the second terminal device, in response to the determination that the second trajectory is matched with the first trajectory.

In at least one alternative embodiment, receiving a first trajectory may comprise at least one of: receiving, by a touch screen, a first sliding trajectory of a user; and acquiring, by an acceleration sensor, a first movement trajectory of the user, wherein the first movement trajectory is a movement trajectory of the first terminal device.

In at least one alternative embodiment, receiving a first trajectory may comprise: receiving at least one continuous first sub-trajectory of a user; and determining the first trajectory according to the at least one continuous first sub-trajectory.

In at least one alternative embodiment, determining whether a second trajectory for a second terminal device is matched with the first trajectory may comprise at least one of: when the difference between the first trajectory and the second trajectory is smaller than a preset threshold, determining that the second trajectory for the second terminal device is matched with the first trajectory; and when the second trajectory for the second terminal device is symmetric with the first trajectory, determining that the second trajectory for the second terminal device is matched with the first trajectory.

As mentioned in the above terminal device, in below embodiments or examples of the terminal device, the Bluetooth connection is taken as an example of the wireless connection, and the embodiments and the examples also may be applied for other wireless connection. Further, in below embodiments or examples of the first terminal device, the mobile terminal is taken as an example of the terminal device, and the embodiments and the examples also may be applied for other terminal device.

Figure 8:
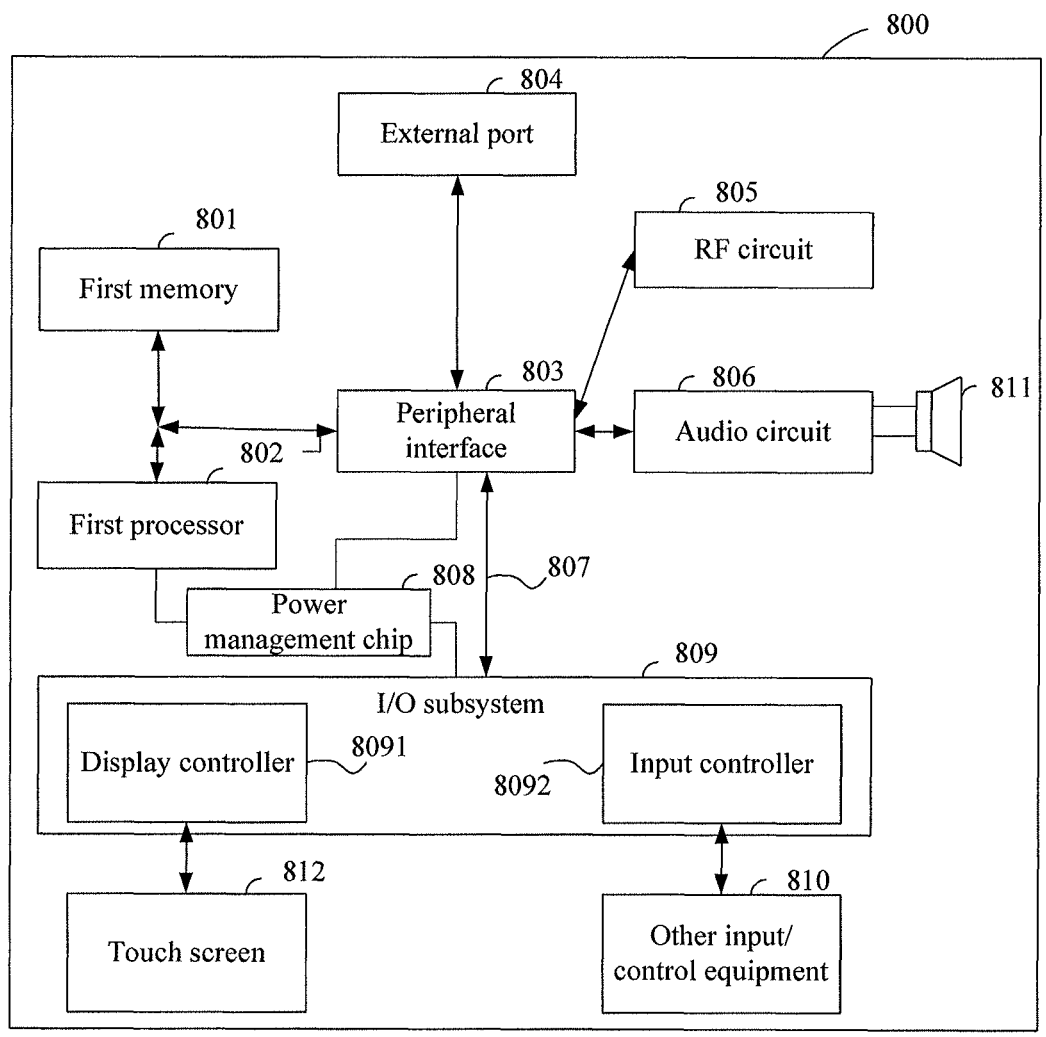
FIG. 8 is a structure schematic diagram illustrating a terminal in accordance with another embodiment of the disclosure.

FIG. 8 is a structure schematic diagram illustrating a terminal (or called as terminal device) in accordance with another embodiment of the disclosure. As shown in FIG. 8, the terminal may include: a casing (not shown in the figure), a first memory 801, a first Central Processing Unit (CPU) 802 (also called as a first processor, hereafter called as CPU for short), a computer program stored in the first memory 801 and capable of running on the first processor 802, a circuit board (not shown in the figure) and a power circuit (not shown in the figure). The circuit board is arranged in a space enclosed by the casing; the first CPU 802 and the first memory 801 are arranged on the circuit board; the power circuit is configured to supply power to each circuit or components of the terminal; the first memory 801 is configured to store an executable program code; and the first CPU 802 reads the executable program code stored in the first memory 801 to execute a program corresponding to the executable program code to execute the following blocks:

receiving a first trajectory input by a user in a screen-off state; determining whether a target mobile terminal exists or not, wherein the target mobile terminal is a second mobile terminal receiving a second trajectory matched with the first trajectory; and when the target mobile terminal exists, establishing a Bluetooth connection with the target mobile terminal.

The terminal further includes: a peripheral interface 803, a Radio Frequency (RF) circuit 805, an audio circuit 806, a speaker 811, a power management chip 808, an Input/Output (I/O) subsystem 809, a touch screen 812, other input/control equipment 810 and an external port 804, and these parts communicate through one or more communication buses or signal wires 807.

In addition, the terminal further includes a camera and a Red, Green and Blue (RGB) light sensor. The RGB light sensor is located beside the camera, and may be arranged adjacent to the camera. The camera may be a front camera and may also be a rear camera. The RGB light sensor and the camera may also be configured separately, and for example, the RGB light sensor is configured on a short edge of side edges of the terminal.

It should be understood that the terminal 800 shown in the figure is only an example of the terminal, the terminal 800 may have more or fewer components than those shown in the figure, two or more components may be combined or different component configurations may be made. Each component shown in the figure may be implemented in hardware, software or a combination of the hardware and the software, wherein the hardware includes one or more signal processing and/or application specific integrated circuit.

A terminal provided by the embodiment for controlling a doorbell will be described below in detail. For example, the terminal is a smart phone.

The first memory 801: the first memory 801 may be accessed by the first CPU 802, the peripheral interface 803 and the like, and the first memory 801 may include a first high-speed Random Access Memory (RAM) and may further include a first nonvolatile memory, for example, at least one first disk storage device, flash memory or other first volatile solid-state storage device.

The peripheral interface 803: the peripheral interface 803 may connect an I/O peripheral of the terminal to the first CPU 802 and the first memory 801.

The I/O subsystem 809: the I/O subsystem 809 may connect the I/O peripheral of the terminal for example, the touch screen 812 and the other input/control equipment 810 to the peripheral interface 803. The I/O subsystem 809 may include a display controller 8091 and at least one input controllers 8092 configured to control the other input/control equipment 810, wherein the at least one input controllers 8092 receive electric signals from the other input/control equipment 810 or send electric signals to the other input/control equipment 810, and the other input/control equipment 810 may include a physical button (a pressing button and a rocker arm button and the like), a dial, a slide switch, a joystick and a click roller. It is important to note that the input controller 8092 may be connected with any one of the following: a keyboard, an infrared port, a Universal Serial Bus (USB) interface and indication equipment such as a mouse.

In an embodiment, the touch screen 812 may be classified into a resistance type, a capacitive sensing type, an infrared type or a surface acoustic wave type according to a working principle of the touch screen and a classification of the medium for transmitting information. The touch screen 812 may be classified into an externally-hung type, a built-in type or an integrated type according to a mounting manner. The touch screen 812 may be classified into a vector pressure sensing technology-based touch screen, a resistance technology-based touch screen, a capacitance technology-based touch screen, an infrared technology-based touch screen or a surface acoustic wave technology-based touch screen according to a technical principle.

The touch screen 812: the touch screen 812 is an input interface and output interface between the user terminal and the user, and displays visual output to the user, and the visual output may include a graph, a text, an icon, a video and the like. In at least one alternative embodiment, the touch screen 812 sends an electric signal (for example, an electric signal of a contact surface) triggered by the user on the touch screen to the first CPU 802.

The display controller 8091 in the I/O subsystem 809 receives an electric signal from the touch screen 812 or sends an electric signal to the touch screen 812. The touch screen 812 detects a contact on the touch screen, the display controller 8091 converts the detected contact into interaction with a user interface object displayed on the touch screen 812, so as to implement human-computer interaction, wherein the user interface object displayed on the touch screen 812 may be an icon of a running game, an icon for connecting to a corresponding network and the like. It is important to note that the equipment may further include an optical mouse, and the optical mouse comprises a touch-sensitive surface which does not display visual output or an extension of a touch-sensitive surface formed by the touch screen.

The RF circuit 805 is mainly configured to establish communication between a smart sound box and a wireless network (i.e., a network side) to implement data receiving and sending between the smart sound box and the wireless network, for example, receiving and sending of a short message and an electronic mail.

The audio circuit 806 is mainly configured to receive audio data from the peripheral interface 803, convert the audio data into an electric signal and send the electric signal to the speaker 811.

The speaker 811 is configured to restore a voice signal received from the wireless network by the smart sound box through the RF circuit 805 into a sound and play the sound to the user.

The power management chip 808 is configured to perform power supply and power management on the first CPU 802, the I/O subsystem and the hardware connected with the peripheral interface.

In the embodiment, the first CPU 802 is configured to: in a screen-off state, receive a first trajectory input by a user; determine whether a target mobile terminal exists or not, wherein the target mobile terminal is a second mobile terminal receiving a second trajectory matched with the first trajectory; and when the target mobile terminal exists, establish a Bluetooth connection with the target mobile terminal.

Furthermore, the operation of receiving the first trajectory input by the user includes that: a first sliding trajectory input by the user is received by a touch screen; or, a first movement trajectory input by the user is acquired by an acceleration sensor, wherein the first movement trajectory is a movement trajectory of the first mobile terminal.

Furthermore, the operation of receiving the first trajectory input by the user in the screen-off state includes that: at least one continuous first sub-trajectory input by the user is received in the screen-off state; and the first trajectory is determined according to the at least one continuous first sub-trajectory.

Furthermore, the operation of determining whether the target mobile terminal exists or not includes that: when the second trajectory received by the second mobile terminal is the same as the first trajectory, or when the difference between the first trajectory and the second trajectory is less than a preset threshold, it is determined that the second trajectory is matched with the first trajectory, and the target mobile terminal exists, and the second mobile terminal is determined as the target mobile terminal; or, when the second trajectory received by the mobile terminal is symmetric with the first trajectory, it is determined that the second trajectory is matched with the first trajectory, and the target mobile terminal exists.

Furthermore, the operation of determining whether the target mobile terminal exists or not includes that: at least one second mobile terminal is searched for by a WLAN; the second trajectory received by the second mobile terminal is acquired by the WLAN; and whether the second trajectory is matched with the first trajectory or not is determined; and when the second trajectory is matched with the first trajectory, it is determined that the target mobile terminal exists.

Furthermore, the operation of determining whether the target mobile terminal exists or not includes that: a Bluetooth link key of the first mobile terminal is generated according to the first trajectory; and whether a Bluetooth link key sent by the second mobile terminal is matched with the Bluetooth link key of the first mobile terminal or not is determined, wherein the Bluetooth link key sent by the second mobile terminal is a link key generated according to the second trajectory received by the second mobile terminal.

Furthermore, the operation of generating the Bluetooth link key of the first mobile terminal according to the first trajectory includes that: an image identifier corresponding to the first trajectory is generated according to a coordinate set corresponding to the first trajectory; and the Bluetooth link key of the first mobile terminal is generated according to the image identifier.

The embodiments of the disclosure further provide a computer-readable storage medium, on which a computer program is stored, wherein the program is executed by a processor to implement the following blocks: a first trajectory input by a user is received in a screen-off state; whether a target mobile terminal exists or not is determined, wherein the target mobile terminal is a second mobile terminal receiving a second trajectory matched with the first trajectory; and when the target mobile terminal exists, a Bluetooth connection is established with the target mobile terminal.

Furthermore, the operation of receiving the first trajectory input by the user is received includes that: a first sliding trajectory input by the user is received by a touch screen; or, a first movement trajectory input by the user is acquired by an acceleration sensor, wherein the first movement trajectory is a movement trajectory of the first mobile terminal.

Furthermore, the operation of receiving the first trajectory input by the user is received in the screen-off state includes that: at least one continuous first sub-trajectory input by the user is received in the screen-off state; and the first trajectory is determined according to the at least one continuous first sub-trajectory.

Furthermore, the operation of determining whether the target mobile terminal exists or not includes that: when the second trajectory received by the second mobile terminal is the same as the first trajectory, or when the difference between the first trajectory and the second trajectory is less than a preset threshold, it is determined that the second trajectory is matched with the first trajectory, and the target mobile terminal exists, and the second mobile terminal is determined as the target mobile terminal; or, when the second trajectory received by the second mobile terminal is symmetric with the first trajectory, it is determined that the second trajectory is matched with the first trajectory, and the target mobile terminal exists.

Furthermore, the operation of determining whether the target mobile terminal exists or not includes that: at least one second mobile terminal is searched for by a WLAN; the second trajectory received by the second mobile terminal is acquired by the WLAN; whether the second trajectory is matched with the first trajectory or not is determined, wherein when the second trajectory is matched with the first trajectory, it is determined that the target mobile terminal exists.

Furthermore, the operation of determining whether the target mobile terminal exists or not includes that: a Bluetooth link key of the first mobile terminal is generated according to the first trajectory; and whether a Bluetooth link key sent by the second mobile terminal is matched with the Bluetooth link key of the first mobile terminal or not is determined, wherein the Bluetooth link key sent by the second mobile terminal is a link key generated according to the second trajectory received by the second mobile terminal, when the Bluetooth link key sent by the second mobile terminal is matched with the Bluetooth link key of the first mobile terminal, it is determined that the target mobile terminal exists.

Furthermore, the operation of generating the Bluetooth link key of the first mobile terminal according to the first trajectory includes that: an image identifier corresponding to the first trajectory is generated according to a coordinate set corresponding to the first trajectory; and the Bluetooth link key of the first mobile terminal is generated according to the image identifier.

The computer storage medium of the embodiments of the disclosure may adopt one or any combination of multiple of computer-readable medium. The computer-readable medium may be a computer-readable signal medium or a computer-readable storage medium. The computer-readable storage medium may be, for example, but not limited to, electric, magnetic, optical, electromagnetic, infrared ray or semiconductor system, apparatus or device or any combination thereof. An example (non-exhaustive list) of the computer-readable storage medium includes: an electric connection with at least one wire, a portable computer disk, a hard disk, a RAM, a Read-Only Memory (ROM), an Erasable Programmable ROM (EPROM, or flash memory), an optical fiber, a portable Compact Disc Read-Only Memory (CD-ROM), an optical storage device, a magnetic storage device or any proper combination thereof. In the disclosure, the computer-readable storage medium may be any physical medium including or storing a program, and the program may be used by or be combined for use with an instruction execution system, apparatus or device.

The computer-readable signal medium may include a data signal propagated in a base band or as a part of a carrier, and a computer-readable program code is born in the computer-readable signal medium. This propagated data signal may adopt multiple forms, including, but not limited to, an electromagnetic signal, an optical signal or any proper combination thereof. The computer-readable signal medium may further be any computer-readable medium except the computer-readable storage medium, and the computer-readable medium may send, propagate or transmit a program used by or combined for use with an instruction execution system, apparatus or device.

The program code included in the computer-readable medium may be transmitted by virtue of any proper medium, including, but not limited to, wireless, an electric wire, an optical cable, RF and the like or any proper combination thereof.

The computer program code configured to execute operations of the disclosure may be compiled with at least one programming language or a combination thereof, and the programming languages include an object-oriented programming language such as Java, Smalltalk and C++, and further include a conventional procedural programming language such as "C" language or a similar programming language. The program code may be completely executed on a user computer, partially executed on the user computer, executed as an independent software package, executed partially on the user computer and partially on a remote computer, or completely executed on the remote computer or a server. Under circumstances involving the remote computer, the remote computer may be connected to the user computer through any type of network, including a LAN or a Wide Area Network (WAN), or, may be connected to an external computer (for example, connected to an external computer by virtue of an Internet service provider through the Internet).

It is important to note that the above is merely the alternative embodiment of the disclosure and a technical principle which is applied. Those skilled in the art should know that the disclosure is not limited to the embodiments described above, and those skilled in the art may make various apparent variations, regulations and replacements without departing from the scope of protection of the disclosure. Therefore, although the disclosure has been described above with the embodiments in more detail, the disclosure is not limited to the embodiments and may further include more other equivalent embodiments without departing from the concept of the disclosure.

What is claimed is:

1. A method of wireless connection, comprising:
obtaining a first trajectory for a first terminal device, the first terminal device being in a screen-off state, the first trajectory indicating a trajectory of a first gesture;
determining whether a second trajectory for a second terminal device is matched with the first trajectory, the second trajectory indicating a trajectory of a second gesture; and
establishing a wireless connection between the first terminal device and the second terminal device, in response to the determination that the second trajectory is matched with the first trajectory,
wherein determining whether a second trajectory for a second terminal device is matched with the first trajectory comprises: generating a wireless link key of the first terminal device according to the first trajectory; and when a wireless link key sent by the second terminal device is matched with the wireless link key of the first terminal device, determining that the second trajectory for the second terminal device is matched with the first trajectory, the wireless link key sent by the second terminal device being a link key generated according to the second trajectory for the second terminal device;
wherein generating a wireless link key of the first terminal device according to the first trajectory comprises: generating, according to a coordinate set corresponding to the first trajectory, an image identifier corresponding to the first trajectory; and generating the wireless link key of the first terminal device according to the image identifier;
wherein generating according to a coordinate set corresponding to the first trajectory, an image identifier corresponding to the first trajectory comprises: generating a trajectory image corresponding to the first trajectory according to the coordinate set corresponding to the first trajectory; and generating the image identifier corresponding to the generated trajectory image according to a relationship between the image identifier and the trajectory image; and wherein generating the wireless link key of the first terminal device according to the image identifier comprises at least one of: when the image identifier is a digit, setting the digit as the wireless link key of the first terminal device; and converting the image identifier according to a preset encryption algorithm to obtain the wireless link key of the first terminal device.

2. The method as claimed in claim 1, wherein obtaining a first trajectory for a first terminal device comprises at least one of:
receiving, by a touch screen, a first sliding trajectory of a user; and
acquiring, by an acceleration sensor, a first movement trajectory of the user, wherein the first movement trajectory is a movement trajectory of the first terminal device.

3. The method as claimed in claim 1, wherein obtaining a first trajectory for a first terminal device comprises:
receiving at least one continuous first sub-trajectory of a user; and
determining the first trajectory according to the at least one continuous first sub-trajectory.

4. The method as claimed in claim 1, wherein determining whether a second trajectory for a second terminal device is matched with the first trajectory comprises at least one of:
when the difference between the first trajectory and the second trajectory is smaller than a preset threshold, determining that the second trajectory for the second terminal device is matched with the first trajectory; and
when the second trajectory for the second terminal device is symmetric with the first trajectory, determining that the second trajectory for the second terminal device is matched with the first trajectory.

5. The method as claimed in claim 1, wherein determining whether a second trajectory for a second terminal device is matched with the first trajectory comprises:
searching for the second terminal device via a Wireless Local Area Network (WLAN);
acquiring, via the WLAN, the second trajectory for the second terminal device; and
determining whether the second trajectory for the second terminal device is matched with the first trajectory.

6. A first terminal device for wireless connection, comprising:
at least one processor; and
a non-transitory computer-readable storage medium, coupled to the at least one processor and storing at least one computer executable instructions thereon, which when the at least one computer executable instructions is executed by the at least one processor, cause the at least one processor to carry out following actions:
when the first terminal device is in a screen-off state, receiving a first trajectory, the first trajectory indicating a trajectory of a first gesture;
determining whether a second trajectory for a second terminal device is matched with the first trajectory, the second trajectory indicating a trajectory of a second gesture; and
in response to the determination that the second trajectory is matched with the first trajectory, establishing a wireless connection between the first terminal device and the second terminal device;
wherein determining whether a second trajectory for a second terminal device is matched with the first trajectory comprises, generating a wireless link key of the first terminal device according to the first trajectory; and when a wireless link key sent by the second terminal device is matched with the wireless link key of the first terminal device, determining that the second trajectory for the second terminal device is matched with the first trajectory, the wireless link key sent by the second terminal device being a link key generated according to the second trajectory for the second terminal device;
wherein generating a wireless link key of the first terminal device according to the first trajectory comprises: generating, according to a coordinate set corresponding to the first trajectory, an image identifier corresponding to the first trajectory; and generating the wireless link key of the first terminal device according to the image identifier;
wherein generating according to a coordinate set corresponding to the first trajectory, an image identifier corresponding to the first trajectory comprises: generating a trajectory image corresponding to the first trajectory according to the coordinate set corresponding to the first trajectory; and generating the image identifier corresponding to the generated trajectory image according to a relationship between the image identifier and the trajectory image; and
wherein generating the wireless link key of the first terminal device according to the image identifier comprises at least one of: when the image identifier is a digit, setting the digit as the wireless link key of the first terminal device; and converting the image identifier according to a preset encryption algorithm to obtain the wireless link key of the first terminal device.

7. The first terminal device as claimed in claim 6, wherein the determining whether a second trajectory for a second terminal device is matched with the first trajectory comprises:
receiving, from the second terminal device, the second trajectory; and
determining by the first terminal device, whether the second trajectory for the second terminal device is matched with the first trajectory for the first terminal device.

8. The first terminal device as claimed in claim 6, wherein the first terminal device further comprises at least one of:
a touch screen, configured to receive a first sliding trajectory of a user; and
an acceleration sensor, configured to acquire a first movement trajectory of the user, wherein the first movement trajectory is a movement trajectory of the first terminal device.

9. The first terminal device as claimed in claim 6, wherein receiving a first trajectory comprises:
receiving at least one continuous first sub-trajectory of a user; and
determining the first trajectory according to the at least one continuous first sub-trajectory.

10. The first terminal device as claimed in claim 6, wherein determining whether a second trajectory for a second terminal device is matched with the first trajectory comprises:
when the difference between the first trajectory and the second trajectory is smaller than a preset threshold, determining that the second trajectory for the second terminal device is matched with the first trajectory; and
when the second trajectory for the second terminal device is symmetric with the first trajectory, determining that the second trajectory for the second terminal device is matched with the first trajectory.

11. The first terminal device as claimed in claim 6, wherein determining whether a second trajectory for a second terminal device is matched with the first trajectory comprises:
   searching for the second terminal device via a Wireless Local Area Network (WLAN);
   acquiring, via the WLAN, the second trajectory for the second terminal device; and
   determining whether the second trajectory for the second terminal device is matched with the first trajectory.

12. A non-transitory computer-readable storage medium, on which a computer program is stored, wherein the computer program is executed by a processor to carry out following actions:
   when a first terminal device is in a screen-off state, receiving a first trajectory, the first trajectory indicating a trajectory of a first gesture;
   determining whether a second trajectory for a second terminal device is matched with the first trajectory, the second trajectory indicating a trajectory of a second gesture; and
   establishing a wireless connection between the first terminal device and the second terminal device, in response to the determination that the second trajectory is matched with the first trajectory;
   wherein determining whether a second trajectory for a second terminal device is matched with the first trajectory comprises: generating a wireless link key of the first terminal device according to the first trajectory, and when a wireless link key sent by the second terminal device is matched with the wireless link key of the first terminal device, determining that the second trajectory for the second terminal device is matched with the first trajectory, the wireless link key sent by the second terminal device being a link key generated according to the second trajectory for the second terminal device;
   wherein generating a wireless link key of the first terminal device according to the first trajectory comprises: generating, according to a coordinate set corresponding to the first trajectory, an image identifier corresponding to the first trajectory; and generating the wireless link key of the first terminal device according to the image identifier;
   wherein generating according to a coordinate set corresponding to the first trajectory, an image identifier corresponding to the first trajectory comprises: generating a trajectory image corresponding to the first trajectory according to the coordinate set corresponding to the first trajectory, and generating the image identifier corresponding to the generated trajectory image according to a relationship between the image identifier and the trajectory image, and wherein generating the wireless link key of the first terminal device according to the image identifier comprises at least one of: when the image identifier is a digit, setting the digit as the wireless link key of the first terminal device; and converting the image identifier according to a preset encryption algorithm to obtain the wireless link key of the first terminal device.

13. The non-transitory computer-readable storage medium as claimed in claim 12, wherein receiving a first trajectory comprises at least one of:
   receiving, by a touch screen, a first sliding trajectory of a user; and
   acquiring, by an acceleration sensor, a first movement trajectory of the user, wherein the first movement trajectory is a movement trajectory of the first terminal device.

14. The non-transitory computer-readable storage medium as claimed in claim 12, wherein receiving a first trajectory comprises:
   receiving at least one continuous first sub-trajectory of a user; and
   determining the first trajectory according to the at least one continuous first sub-trajectory.

15. The non-transitory computer-readable storage medium as claimed in claim 12, wherein determining whether a second trajectory for a second terminal device is matched with the first trajectory comprises at least one of:
   when the difference between the first trajectory and the second trajectory is smaller than a preset threshold, determining that the second trajectory for the second terminal device is matched with the first trajectory; and
   when the second trajectory for the second terminal device is symmetric with the first trajectory, determining that the second trajectory for the second terminal device is matched with the first trajectory.

* * * * *